(12) United States Patent
Kim et al.

(10) Patent No.: US 8,442,133 B2
(45) Date of Patent: May 14, 2013

(54) APPARATUS AND METHOD FOR TRANSMITTING COEXISTENCE BEACON PROTOCOL PACKET IN COGNITIVE RADIO WIRELESS COMMUNICATION SYSTEM

(75) Inventors: Sang-Bum Kim, Seoul (KR); Eun-Taek Lim, Suwon-si (KR); Jung-Soo Woo, Suwon-si (KR); Ho-Dong Kim, Gwacheon-si (KR); Cheng Shan, Suwon-si (KR); Ju-Yeon Song, Seoul (KR); Yong-Ho Park, Cheonan-si (KR); Jae-Ik Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 12/660,412

(22) Filed: Feb. 26, 2010

(65) Prior Publication Data

US 2010/0226312 A1 Sep. 9, 2010

(30) Foreign Application Priority Data

Mar. 4, 2009 (KR) ........................ 10-2009-0018369

(51) Int. Cl.
*H04L 27/28* (2006.01)
*H04L 12/28* (2006.01)
*H04W 4/00* (2009.01)

(52) U.S. Cl.
USPC .................. 375/260; 370/328; 370/395.2

(58) Field of Classification Search .......... 370/328–330, 370/395.2–395.42, 436–439, 441–444; 375/260
See application file for complete search history.

(56) References Cited

U.S. PATENT DOCUMENTS

| | | | | |
|---|---|---|---|---|
| 6,643,277 | B2 * | 11/2003 | Garrison et al. | 370/329 |
| 7,502,341 | B2 * | 3/2009 | Matoba et al. | 370/319 |
| 7,924,869 | B2 * | 4/2011 | Jinxia et al. | 370/461 |
| 7,978,624 | B2 * | 7/2011 | Wang et al. | 370/252 |
| 2008/0298310 | A1 * | 12/2008 | Hu | 370/328 |
| 2009/0180453 | A1 * | 7/2009 | Hu | 370/338 |
| 2010/0027473 | A1 * | 2/2010 | Ghosh | 370/328 |
| 2010/0091701 | A1 * | 4/2010 | Youn et al. | 370/328 |
| 2012/0026997 | A1 * | 2/2012 | Seok et al. | 370/338 |
| 2012/0120892 | A1 * | 5/2012 | Freda et al. | 370/329 |

* cited by examiner

*Primary Examiner* — Thai Hoang (57) ABSTRACT

An apparatus and a method for transmitting a Coexistence Beacon Protocol (CBP) packet in a Cognitive Radio (CR) wireless communication system are provided. In the method for transmitting CBP packet in a transmitter that operates in a scalable Orthogonal Frequency Division Multiple Access (OFDMA) mode, a priority is given to each channel of one or more channels based at least partly upon channel use statuses of two or more neighbor Wireless Regional Area Networks (WRANs). Whether a Quality of Service (QoS) for CBP packet transmission for each channel is met is sequentially determined according to the respective priority. A channel having a highest priority is selected from the one or more channels meeting the QoS as a channel for CBP packet transmission. A CBP packet is transmitted via the selected channel.

20 Claims, 7 Drawing Sheets

APPARATUS AND METHOD FOR TRANSMITTING COEXISTENCE BEACON PROTOCOL PACKET IN COGNITIVE RADIO WIRELESS COMMUNICATION SYSTEM

CROSS-REFERENCE TO RELATED APPLICATION(S) AND CLAIM OF PRIORITY

This application claims the benefit under 35 U.S.C. §119(a) of a Korean patent application filed in the Korean Intellectual Property Office on Mar. 4, 2009 and assigned Serial No. 10-2009-0018369, the entire disclosure of which is hereby incorporated by reference.

TECHNICAL FIELD OF THE INVENTION

The present invention relates to a Cognitive Radio (CR) wireless communication system. More particularly, the present invention relates to an apparatus and a method for transmitting a Coexistence Beacon Protocol (CBP) packet in a CR wireless communication system.

BACKGROUND OF THE INVENTION

As wireless communication technology develops, systems that use various kinds of communication schemes coexist. For example, a wireless communication system that uses a Code Division Multiple Access (CDMA) scheme called a $2^{nd}$ generation technique, a wireless communication system that uses an International Mobile Telecommunication (IMT)-2000 scheme called a $3^{rd}$ generation technique, and a system that uses an Orthogonal Frequency Division Multiplexing (OFDM) scheme called a $4^{th}$ generation technique coexist. At this point, the systems that use coexisting different communication schemes provide services using different frequency bands. However, since frequency resources for wireless communication are limited, the frequency resources are not sufficient for coexistence of lots of systems.

Therefore, a Cognitive Radio (CR) technique that uses a temporarily unused frequency band or channel of already allocated frequency bands in use is being studied. That is, even a system that is licensed for a specific frequency band always does not use all relevant frequency bands. Therefore, the CR wireless communication system searches for a channel that is temporarily unused by the licensed system, and then provides a service to user terminals inside a service area via the searched channel. For example, temporarily unused frequency bands of allocated frequency bands may be used for transmitting a TeleVision (TV) signal.

In the case of applying a CR technique in the wireless communication system, for efficient sharing of frequency resources, each base station in charge of respective cells needs to share communication information with other base stations. For this purpose, in the CR wireless communication system, base stations transmit a CBP packet including communication information regarding themselves to neighbor base stations via a synchronized Self-Coexistence Window (SCW) slot, and the neighbor base stations receive the CBP packet, so that the communication information is shared. Here, the SCW slot is located at a predetermined portion of every frame, and the CBP packet includes various information related to a self-coexistence algorithm such as a location of a relevant base station, sensing results, scheduling information, a backup channel, and the like.

As described above, in a CR wireless communication system, base stations share information required for respective cells with one another by transmitting/receiving a CBP packet via an SCW. However, since the SCW has a limited amount of resource, in the case where a plurality of base stations intend to transmit CBP packets, collision of CBP packets occurs. When base stations cannot normally receive CBP packets from neighbor base stations due to collision of CBP packets, a system cannot operate normally. Therefore, for a CR wireless communication system to normally operate, an alternative for transmitting/receiving the CBP packet without collision or an error is required.

SUMMARY OF THE INVENTION

To address the above-discussed deficiencies of the prior art, it is a primary aspect of the present invention to provide an apparatus and a method for avoiding collision of transmission of CBP packets in a CR wireless communication system.

Another aspect of the present invention is to provide an apparatus and a method for allowing a plurality of Wireless Regional Area Networks (WRANs) to transmit CBP packets via different channels in a CR wireless communication system.

Still another aspect of the present invention is to provide an apparatus and a method for switching a channel for transmitting a CBP packet in a CR wireless communication system.

In accordance with an aspect of the present invention, a method for transmitting a Coexistence Beacon Protocol (CBP) packet of a transmitter that operates in a scalable Orthogonal Frequency Division Multiple Access (OFDMA) mode in a Cognitive Radio (CR) wireless communication system is provided. The method includes giving priority to each channel with reference to channel use statuses of neighbor Wireless Regional Area Networks (WRANs), sequentially determining whether Quality of Service (QoS) for CBP packet transmission is met according to the priority, selecting a channel having a highest priority from one or more channels meeting the QoS as a channel for CBP packet transmission, and transmitting a CBP packet via the selected channel.

In accordance with another aspect of the present invention, a method for receiving a Coexistence Beacon Protocol (CBP) packet of a receiver in a Cognitive Radio (CR) wireless communication system is provided. The method includes determining a monitoring range for receiving a CBP packet with reference to channel use statuses of neighbor Wireless Regional Area Networks (WRANs), giving a priority to each channel included in the monitoring range, attempting to sequentially receive CPB packets according to the priority, and when the CBP packets are received, determining information contained in the CBP packets.

In accordance with still another aspect of the present invention, an apparatus of a transmitter that operates in a scalable Orthogonal Frequency Division Multiple Access (OFDMA) mode in a Cognitive Radio (CR) wireless communication system is provided. The apparatus includes a controller for giving a priority to each channel with reference to channel use statuses of neighbor Wireless Regional Area Networks (WRANs), sequentially determining whether Quality of Service (QoS) for Coexistence Beacon Protocol (CBP) packet transmission is met, selecting a channel having a highest priority from one or more channels meeting the QoS as a channel for CBP packet transmission, and a transmitter for transmitting a CBP packet via the selected channel.

In accordance with further another aspect of the present invention, an apparatus of a receiver in a Cognitive Radio (CR) wireless communication system is provided. The apparatus includes a controller for determining a monitoring range for receiving a Coexistence Beacon Protocol (CBP) packet with reference to channel use statuses of neighbor Wireless Regional Area Networks (WRANs), giving a priority to each channel included in the monitoring range, and attempting to sequentially receive CPB packets according to the priority, and a reader for, when the CBP packets are received, determining information contained in the CBP packets.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present invention provide a technique for avoiding collision of CBP packet transmission in a CR wireless communication system. Though the present invention is described using an OFDM/OFDMA wireless communication system as an example, the present invention is applicable to wireless communication systems of different schemes.

In a CR wireless communication system, a CBP packet may be transmitted by a user terminal as well as a base station. In other words, the terminal may transmit a CBP packet under the control of a serving base station. In addition, a CBP packet may be received by a terminal as well as a base station, and the terminal transfers the received CBP packet to a serving base station. That is, in transmitting/receiving a CBP packet, a base station and terminals inside a cell of the base station operate as one entity. In other words, a logical entity of transmission/reception of a CBP packet is not one node such as a base station and a terminal, but a WRAN including the base station and all of the terminals inside the cell of the base station. Therefore, for convenience in description, the WRAN is regarded as one object in description of the present invention.

Figure 1:
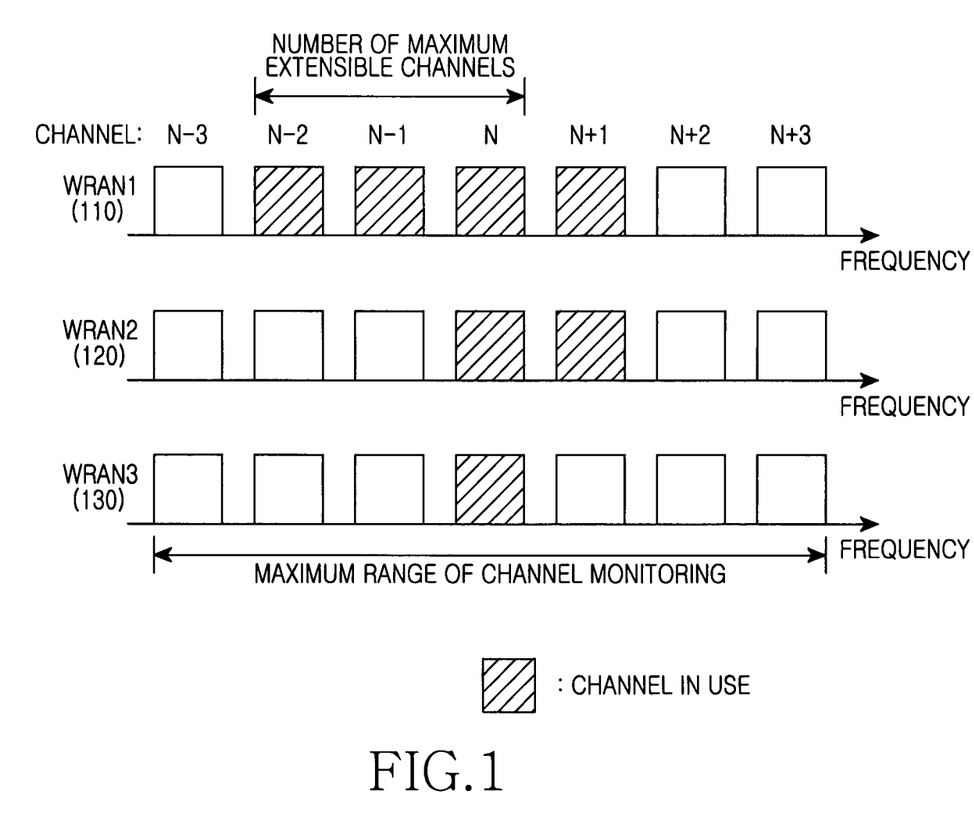
FIG. 1 is a view illustrating an example of a channel use in a CR wireless communication system according to an exemplary embodiment of the present invention.

An exemplary embodiment of the present invention proposes an alternative for allowing a plurality of WRANs to transmit CPB packets regarding themselves via different frequency bands by utilizing an advantage of scalability that can use a plurality of frequency bands. Referring to FIG. 1, a system according to a scalable OFDMA scheme may use a plurality of frequency bands, that is, channels inside one cell. However, the system may simultaneously use channels included inside a maximum scalable range. For example, when the maximum scalable range is a 4-channel, a maximum interval between two arbitrary channels of a plurality of bands in use is a 2-channel.

That is, since a plurality of channels may be used, a plurality of WRANs do not need to transmit CBP packets via the same channel. However, when viewed from a side for receiving a CBP packet, since CBP packets of respective WRANs are received via one of the plurality of channels, a complicated operation is required to receive the CBP packets. Therefore, it is preferable to minimize a situation where CBP packets are transmitted via different channels. For this purpose, WRANs of the system according to an exemplary embodiment of the present invention consider transmission of CBP packets via the same channel first, and transmit CBP packets via different channels only when it is determined that an SCW slot is not sufficient. Since a WRAN that receives a CBP packet cannot recognize a channel via which the CBP packet is transmitted, the WRAN need to monitor channels not in use even when only one channel is used. Here, an object of the monitoring is determined with consideration of neighbor channels of an operating channel and channels used by other WRANs. For example, in FIG. 1, a maximum monitoring range for receiving a CBP packet of a WRAN1 110 is from a channel N−2 to a channel N+1, a maximum monitoring range for receiving a CBP packet of a WRAN2 120 is from a channel N−2 to a channel N+3, and a maximum monitoring range for receiving a CBP packet of a WRAN3 130 is from a channel N−3 to a channel N+3.

Figure 2:
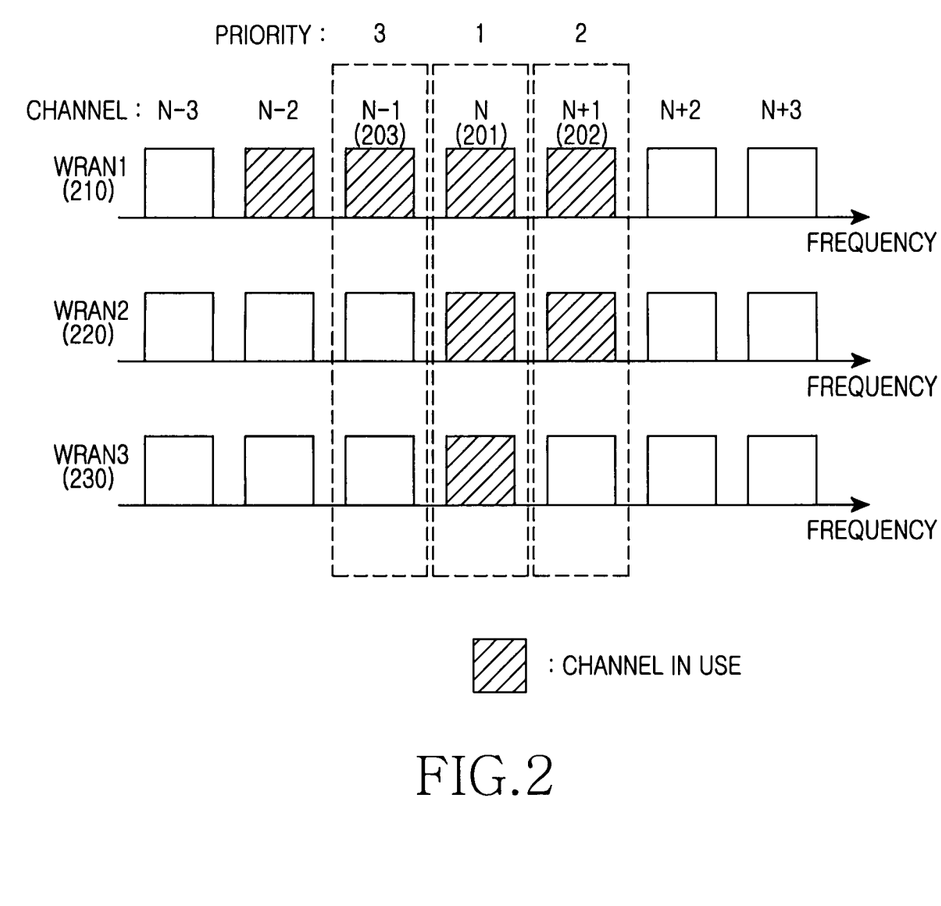
FIG. 2 is a view illustrating an example of priorities between channels in a CR wireless communication system according to an exemplary embodiment of the present invention.

An example of priorities given to channels when a channel for CBP packet transmission is selected is illustrated in FIG. 2. When the number of WRANs that use a channel is large with respect to the total number of WRANs, a high priority is given to that channel. Therefore, referring to FIG. 2, a channel N 201 is given a first priority, a channel N+1 202 is given a second priority, and a channel N−1 203 is given a third priority. After determining the priorities, each WRAN transmits a CBP packet via a channel having a highest priority of channels meeting a QoS for CBP packet transmission. In addition, after selecting a channel for CBP packet transmission, each WRAN determines object channels to be monitored with consideration of the priorities.

Figure 3:
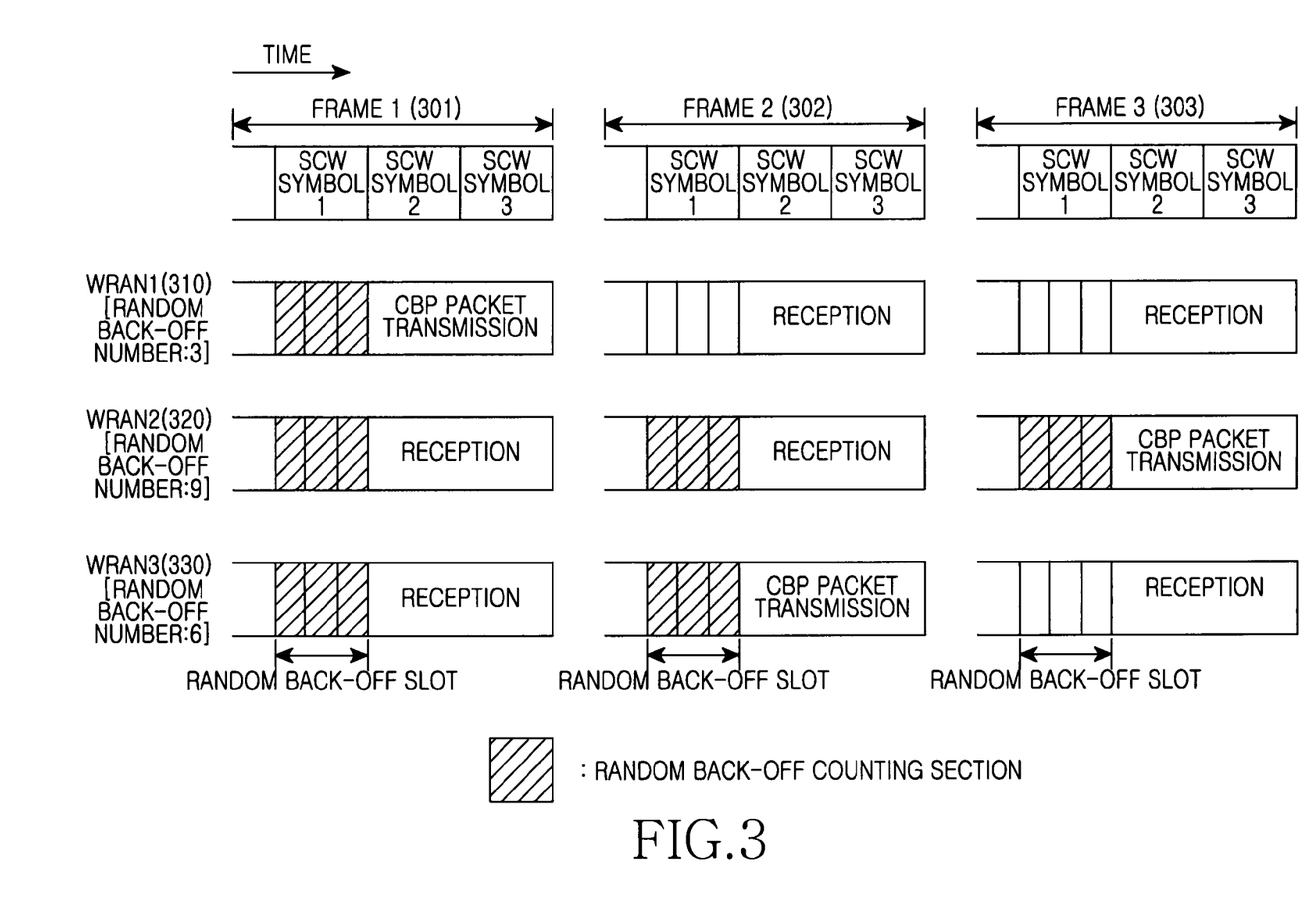
FIG. 3 is a view illustrating an example of contention-based SCW slot occupation in a CR wireless communication system according to an exemplary embodiment of the present invention.

At this point, the QoS for the CBP packet transmission differs depending on an SCW slot occupation scheme. For example, the SCW slot occupation scheme may be one of a contention-based scheme and a reservation-based scheme. According to the contention-based scheme, each WRAN generates a random back-off number, and after SCW back-off slots as many as the random back-off number elapse, transmits a CBP packet. Here, the SCW back-off slots are formed by dividing a first symbol of an SCW slot. However, when a CBP packet is received from a neighbor WRAN before a CBP packet of a relevant WRAN is transmitted, the relevant WRAN stops counting SCW back-off slots. Therefore, a WRAN having a small random back-off number preferentially transmits a CBP packet, and the rest of the WRANs continue counting SCW back-off slots at an SCW slot of the next frame. For example, referring to FIG. 3, a random back-off number of a WRAN1 310 is 3, a random back-off number of a WRAN2 320 is 9, and a random back-off number of a WRAN3 330 is 6, and a CBP packet is transmitted as follows. Referring to FIG. 3, the WRANs 310 to 330 start counting a random back-off slot at an SCW symbol 1 of a frame 1 301. The WRAN1 310 having completed the counting first transmits a CBP packet. Accordingly, the WRAN2 320 and the WRAN3 330 stop the counting and then receive the CBP packet of the WRAN1 310. After that, the WRAN2 320 and the WRAN3 330 resume the counting of a random back-off slot at an SCW symbol 1 of a frame 2 302, and the WRAN3 330, having completed the counting, transmits a CBP packet before the WRAN2 320 transmits a CBP packet. In addition, during the same procedure, the WRAN2 320 transmits a CBP packet at a frame 3 303.

Figure 4:
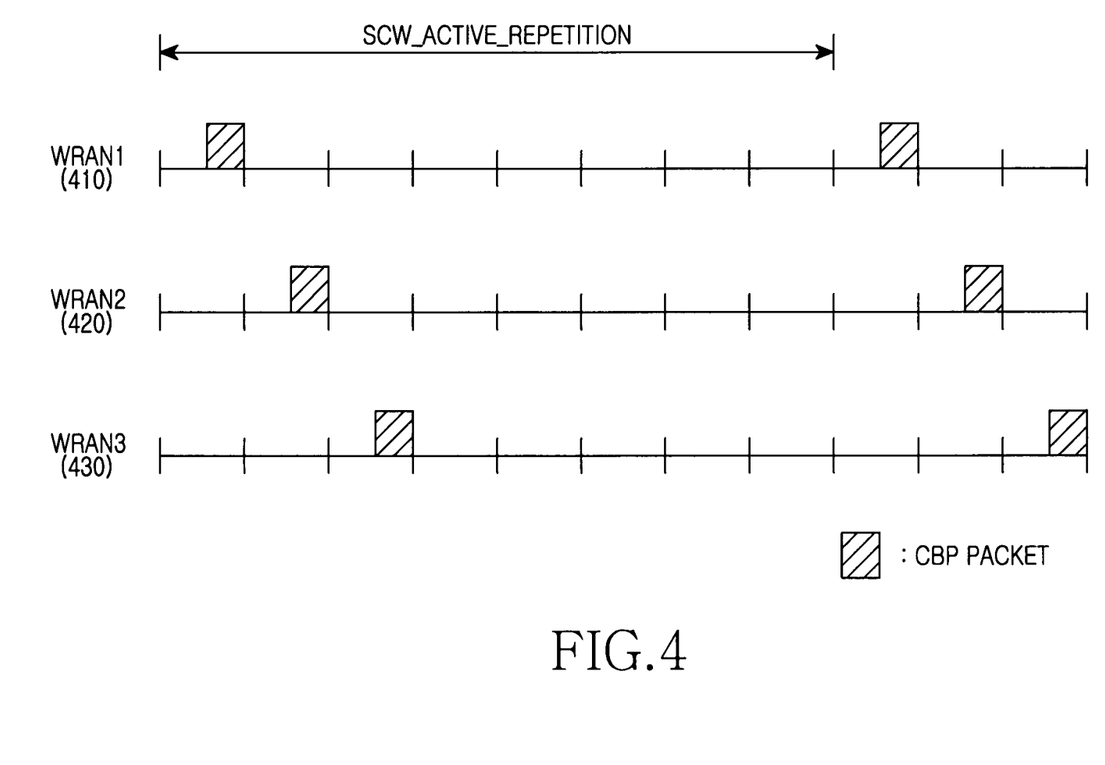
FIG. 4 is a view illustrating an example of reservation-based SCW slot occupation in a CR wireless communication system according to an exemplary embodiment of the present invention.

According to the reservation-based scheme, WRANs search for vacant SCW slots, set a predetermined period, that is, an SCW_Active_Repetition, and then transmit CBP packets according to the SCW_Active_Repetition. At this point, to avoid collision, the SCW_Active_Repetition of respective WRANs may be the same or a multiple of one another. For example, referring to FIG. 4, according to the reservation-based scheme, three WRANs 410 to 430 transmit CBP packets as follows. Referring to FIG. 4, all the WRANs 410 to 430 transmit CBP packets without collision according to the same SCW_Active_Repetition. In the case where the WRAN1 410 and the WRAN2 420 transmit CBP packets at an SCW_Active_Repetition, the WRAN3 430 recognizes a CBP regulation pattern of the WRAN1 410 and the WRAN2 420, and sets the SCW_Active_Repetition of the WRAN3 430 such that collision does not occur.

According to the contention-based scheme as illustrated in FIG. 3, whether QoS is met is determined based on the probability of winning in contention and, specifically, based on the number of WRANs participating in the contention. In contrast, according to the reservation-based scheme as illustrated in FIG. 4, whether QoS is met is determined using a settable SCW_Active_Repetition, and determined by comparing a threshold period determined based on an update frequency of information contained in a CBP packet with the settable SCW_Active_Repetition.

Hereinafter, an operation and a construction of a transmission end and a reception end which transmit/receive a CBP packet are described in more detail with reference to the drawings.

Figure 5:
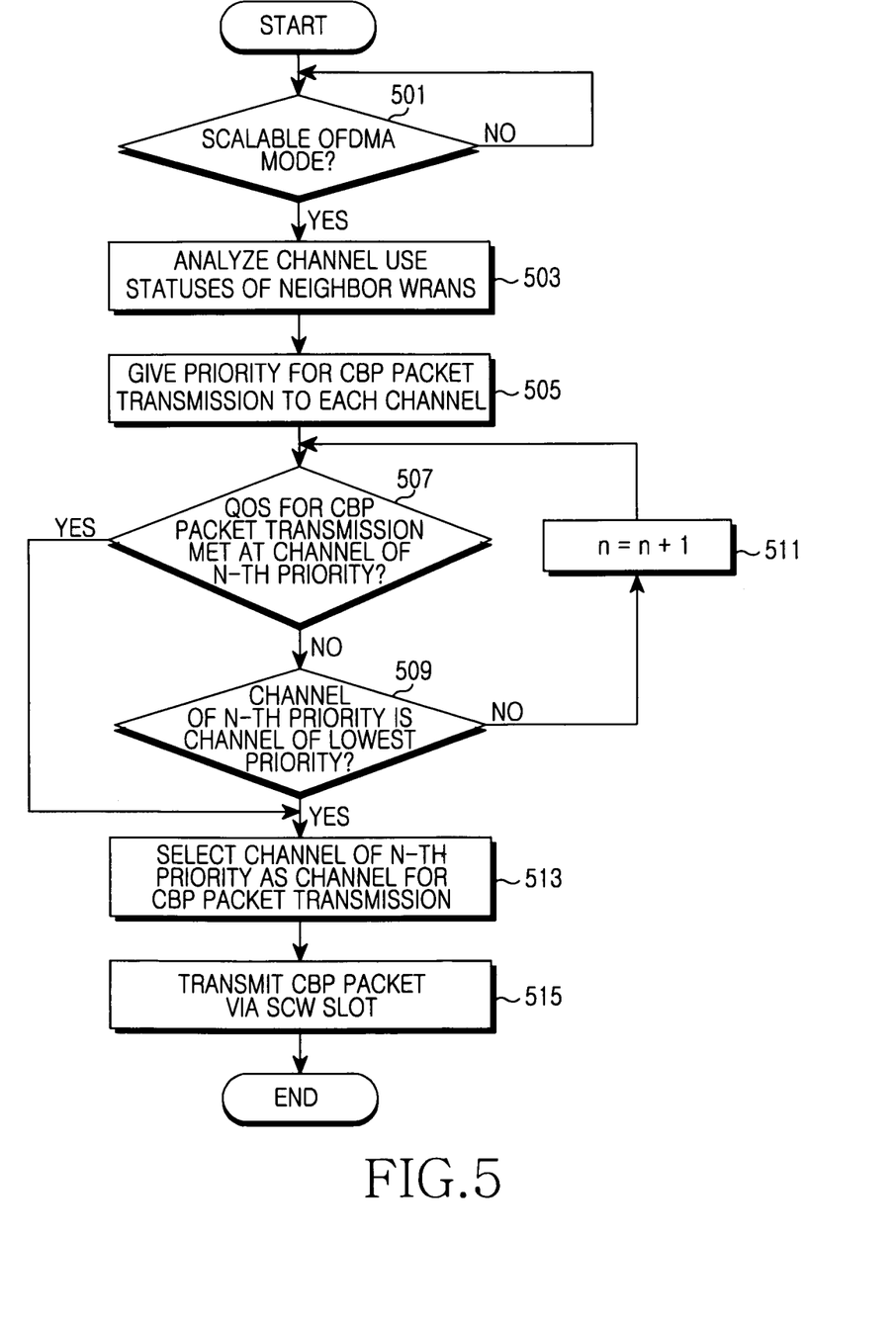
FIG. 5 is a flowchart illustrating an operating procedure of a CBP transmitter in a CR wireless communication system according to an exemplary embodiment of the present invention.

FIG. 5 is a flowchart illustrating an operating procedure of a CBP transmitter in a CR wireless communication system according to an exemplary embodiment of the present invention.

Referring to FIG. 5, the CBP transmitter determines whether the CBP transmitter operates in a scalable OFDMA mode in step 501. That is, the CBP transmitter determines whether it is in a status that can simultaneously transmit signals via a plurality of channels. When the CBP transmitter does not operate in the scalable OFDMA mode, the CBP transmitter needs to transmit a CBP packet via an operation channel, and thus the present procedure is not applied.

In contrast, when the CBP transmitter operates in the scalable OFDMA mode, the CBP transmitter analyzes channel use statuses of neighbor WRANs in step 503. That is, the CBP transmitter analyzes the channel use statuses of the neighbor WRANs by determining whether signals of the neighbor WRANs are received from each channel. At this point, in the case where the CBP transmitter is a terminal, the terminal reports analysis results to a base station. In contrast, when the CBP transmitter is a base station, the base station puts determination results of the base station and analysis results reported from terminals together.

The CBP transmitter gives a priority for CBP packet transmission to each channel in step 505. At this point, when the number of WRANs that use a channel is large with respect to the total number of WRANs, the CBP transmitter gives a high priority to that channel.

After giving the priority, the CBP transmitter determines whether QoS for CBP packet transmission is met at a channel of an n-th priority in step 507. Here, n is initialized to 1 when the present procedure starts. That is, the CBP transmitter calculates a QoS satisfaction metric corresponding to the contention-based scheme or the reservation-based scheme with respect to the channel of the n-th priority, and determines whether the QoS satisfaction metric meets a satisfaction condition. For example, according to the contention-based scheme, the QoS satisfaction metric is the number of WRANs participating in the contention, and the satisfaction condition is that the number of the WRANs participating in the contention is smaller than a predetermined threshold for the number of the WRANs. In contrast, according to the reservation-based scheme, the QoS satisfaction index is a settable minimum SCW_Active_Repetition, and the satisfaction condition is that the minimum SCW_Active_Repetition is smaller than a reference period determined based on an update frequency of information contained in a CBP packet, or determined in advance.

When the QoS is not met, the CBP transmitter determines whether the channel of the n-th priority is a channel of a lowest priority in step 509. In other words, the CBP transmitter determines whether candidate channels for which the QoS is to be determined exist. When the channel of the n-th priority is not the channel of the lowest priority, the CBP transmitter increases n by 1 in step 511, and proceeds to step 507.

In contrast, when the channel of the n-th priority is the channel of the lowest priority, or when the QoS is met in step 507, the CBP transmitter selects the channel of the n-th priority as a channel for CBP packet transmission in step 513.

The CBP transmitter transmits a CBP packet using an SCW slot of the selected channel in step 515. At this point, the CBP transmitter may transmit the CBP packet according to the contention-based scheme or the reservation-based scheme.

Figure 6:
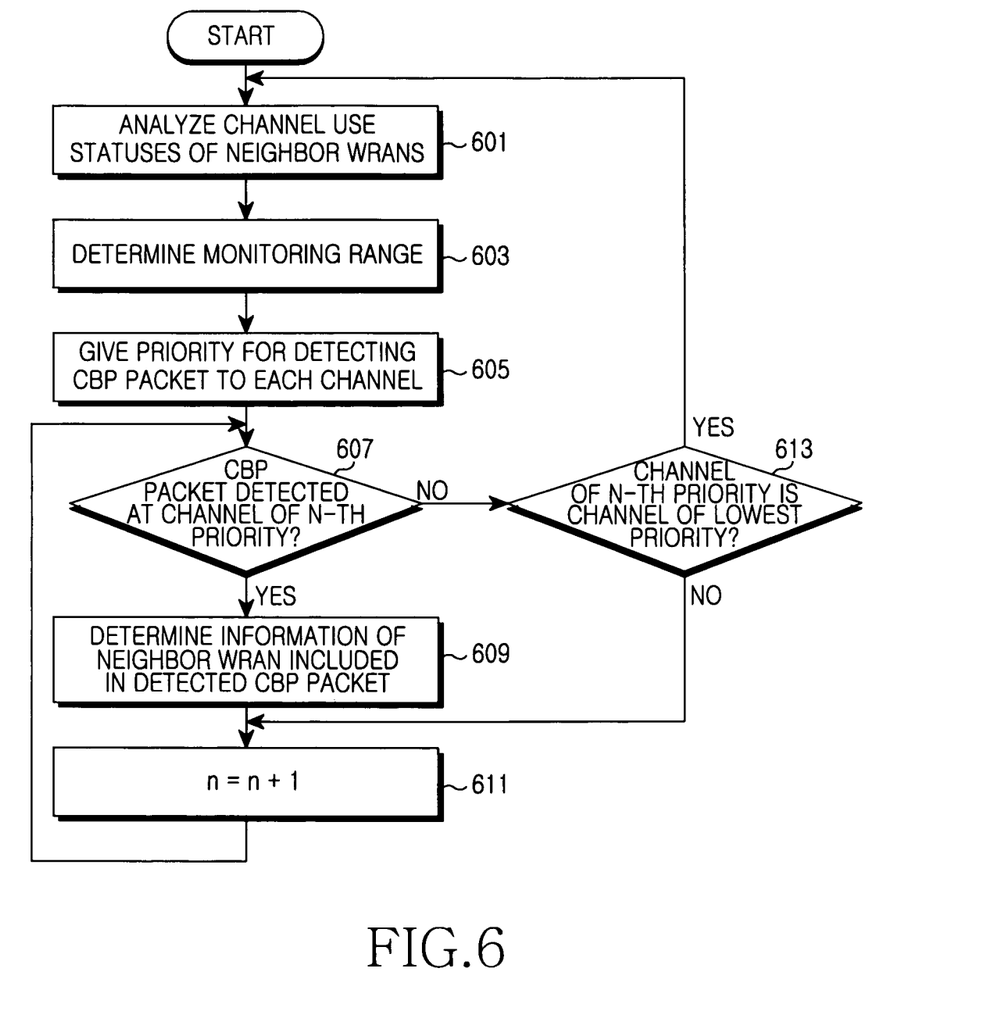
FIG. 6 is a flowchart illustrating an operating procedure of a CBP receiver in a CR wireless communication system according to an exemplary embodiment of the present invention.

FIG. 6 is a flowchart illustrating an operating procedure of a CBP receiver in a CR wireless communication system according to an exemplary embodiment of the present invention.

Referring to FIG. 6, the CBP receiver analyzes channel use statuses of neighbor WRANs in step 601. That is, the CBP receiver analyzes the channel use statuses of the neighbor WRANs by determining whether signals of the neighbor WRANs are received via each channel. At this point, in the case where the CBP receiver is a terminal, the terminal reports analysis results to a base station. In contrast, in the case where the CBP receiver is a base station, the base station puts determination results of the base station and analysis results reported from terminals together.

After analyzing the channel use statuses of the neighbor WRANs, the CBP receiver determines a monitoring range in step 603. In other words, the CBP receiver selects object channels to be monitored. At this point, the CBP receiver determines the monitoring range with consideration of an operation channel of the CBP receiver and operation channels of other WRANs. That is, the CBP receiver determines the monitoring range such that all channels via which the other WRANs may transmit CBP packets are included within a maximum extensible range including the operation channel of the CBP receiver.

After determining the monitoring range, the CBP receiver gives a priority for detecting a CBP packet to each channel included in the monitoring range in step 605. At this point, the CBP receiver gives a high priority to a relevant channel when the number of WRANs that use the relevant channel is large with respect to the total number of WRANs.

After giving the priority, the CBP receiver determines whether a CBP packet is detected at a channel of an n-th priority in step 607. In other words, the CBP receiver determines whether a signal is received via an SCW slot of the channel of the n-th priority, and whether decoding of a CBP packet for the signal is successful when the signal is received. Here, n is initialized to 1 at the beginning of the present procedure.

When the CBP packet is detected, the CBP receiver determines information of a neighbor WRAN contained in the detected CBP packet in step 609. Here, the information includes various information related to a self-coexistence algorithm such as a location of a relevant base station, sensing results, scheduling information, a backup channel list, and the like. After that, the CBP receiver increases n by 1 in step 611, and returns to step 607.

When the CBP packet is not detected, the CBP receiver determines whether the channel of the n-th priority is a channel of a lowest priority in step 613. In other words, the CBP receiver determines whether a candidate channel for which detection of a CBP packet is to be determined exists. When the channel of the n-th priority is not the channel of the lowest priority, the CBP receiver increases n by 1 in step 611, and proceeds to step 607. In contrast, when the channel of the n-th priority is the channel of the lowest priority, the CBP receiver returns to step 601.

Figure 7:
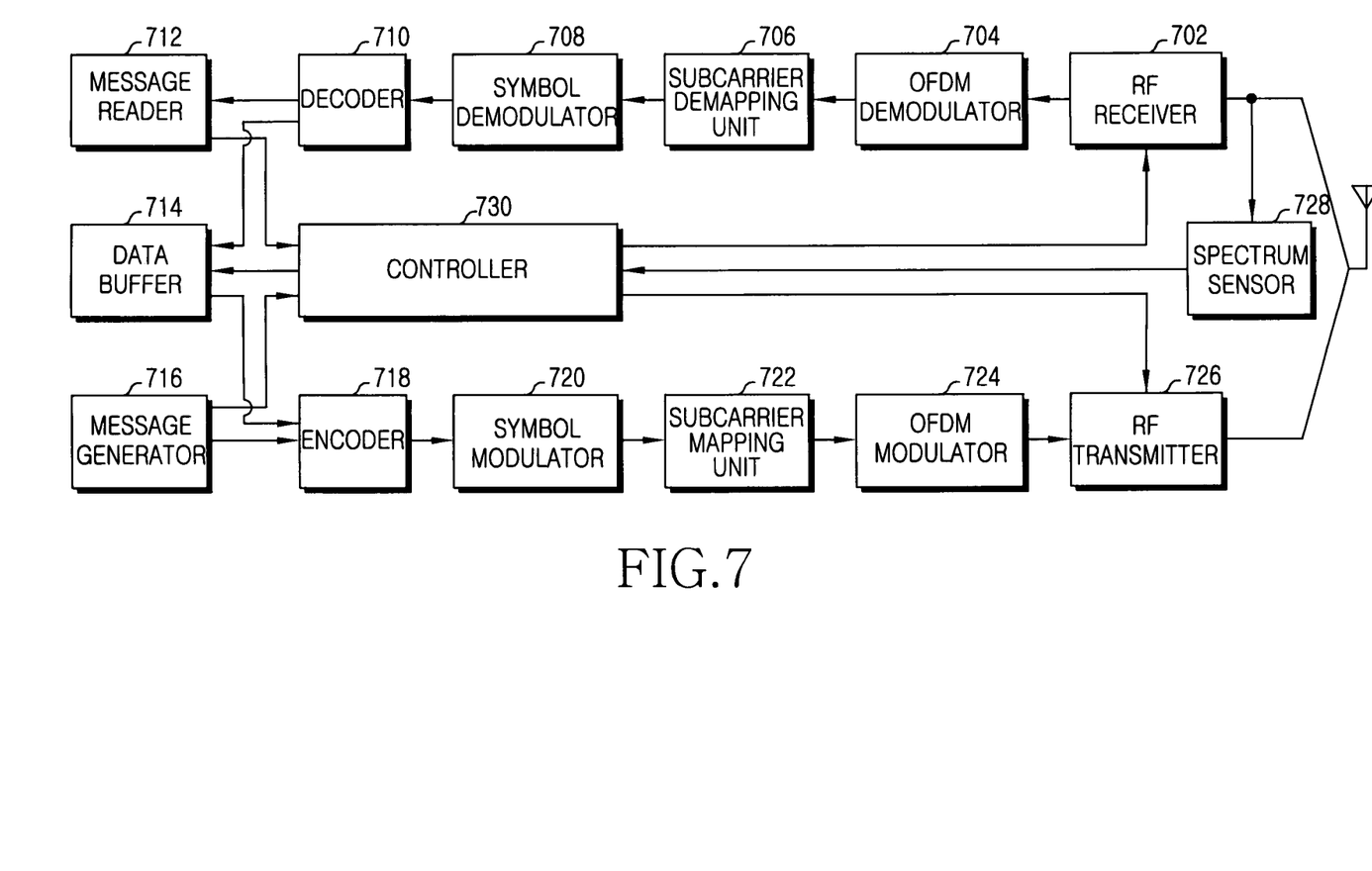
FIG. 7 is a block diagram of a CBP transmitter and a CBP receiver in a CR wireless communication system according to an exemplary embodiment of the present invention.

FIG. 7 is a block diagram of a CBP transmitter and a CBP receiver in a CR wireless communication system according to an exemplary embodiment of the present invention.

Referring to FIG. 7, the CBP transmitter and the CBP receiver include a Radio Frequency (RF) receiver 702, an OFDM demodulator 704, a subcarrier demapping unit 706, a symbol demodulator 708, a decoder 710, a message reader 712, a data buffer 714, a message generator 716, an encoder 718, a symbol modulator 720, a subcarrier mapping unit 722, an OFDM modulator 724, an RF transmitter 726, a spectrum sensor 728, and a controller 730.

The RF receiver 702 down-converts an RF signal received via an antenna into a baseband signal. The OFDM demodulator 704 divides the baseband signal on an OFDM symbol basis, cancels a Cyclic Prefix (CP), and then recovers signals in a frequency domain by performing Fast Fourier Transform (FFT). The subcarrier demapping unit 706 classifies the signals in the frequency domain on a process basis. The symbol demodulator 708 demodulates the signals to obtain a bit line. The decoder 710 decodes the bit line.

The message reader 712 determines information contained in a received message by reading the received message, and provides the determined information to the controller 730. More particularly, the message reader 712 determines communication information for a neighbor WRAN by reading a CBP packet received from the neighbor WRAN. Here, the communication information includes various information related to a self-coexistence algorithm such as a location of a relevant base station, sensing results, scheduling information, a backup channel list, and the like. The data buffer 714 temporarily stores transmitted/received data. The message generator 716 receives information to be transmitted from the controller 730, and generates a message including the information. More particularly, the message generator 716 generates a CBP packet including communication information of a WRAN.

The encoder 718 encodes a bit line of the CBP packet. The symbol modulator 720 modulates the bit line to obtain complex symbols. The subcarrier mapping unit 722 maps the complex symbols to the frequency domain. The OFDM modulator 724 converts the signals mapped to the frequency domain into signals in a time domain by performing Inverse Fast Fourier Transform (IFFT), and inserts a CP to form baseband OFDM symbols. The RF transmitter 726 up-converts the baseband OFDM symbols into RF signals, and transmits the same via the antenna.

The spectrum sensor 728 searches for signals of a licensed system and neighbor WRANs. That is, the spectrum sensor 728 searches for channels unused and used by the licensed system and the neighbor WRANs. In addition, the spectrum sensor 728 provides sensing results to the controller 730. The controller 730 controls an overall function of the CBP transmitter and the CBP receiver. For example, the controller 730 controls the RF receiver 702 and the RF transmitter 726 to transmit/receive data via a band of an operation channel. In addition, when a plurality of channels is usable, the controller 730 operates in a scalable OFDMA mode. In addition, when operating in the OFDMA mode, the controller 730 selects a channel for CBP packet transmission, and determines a monitoring range for receiving CBP packets from a neighbor WRAN. In addition, the controller 730 transmits a CBP packet via an SCW slot of the selected channel, and attempts to detect a CBP packet from the neighbor WRAN via channels inside the monitoring range.

A detailed operation of the controller 730 transmitting the CBP packet is described below. When operating in the scalable OFDMA mode, the controller 730 analyzes channel use statuses of neighbor WRANs using sensing results from the spectrum sensor 728. Subsequently, the controller 730 gives a priority for transmitting a CBP packet to each channel depending on the number of WRANs that use the each channel. At this point, when the number of WRANs that use the channel is large with respect to the total number of WRANs, a high priority is given to that channel. After giving the priority, the controller 730 sequentially determines whether QoS for CBP packet transmission at respective channels is met according to the priority. Here, n is initialized to 1 at the beginning. That is, the controller 730 calculates a QoS satisfaction metric corresponding to the contention-based scheme or the reservation-based scheme with respect to the channel of the n-th priority, and determines whether the QoS satisfaction metric meets a satisfaction condition. For example, according to the contention-based scheme, the QoS satisfaction index is the number of WRANs participating in the contention, and the satisfaction condition is that the number of WRANs participating in the contention is smaller than a predetermined threshold for the number of WRANs. In contrast, according to the reservation-based scheme, the QoS satisfaction index is a settable minimum SCW_Active_Repetition. The satisfaction condition is determined based on an update frequency of information contained in a CBP packet, or is that the minimum SCW_Active_Repetition is smaller than a predetermined reference period. As a result of determining whether QoS is met, the controller 730 selects a channel having a highest priority from channels that meet the QoS, as a channel for CBP packet transmission. When the QoS is not met at all channels, the controller 730 selects a channel having a lowest priority as a channel for the CBP packet transmission.

A detailed operation of the controller 730 for receiving the CBP packet is described below. First, the controller 730 analyzes channel use statuses of neighbor WRANs using sensing results from the spectrum sensor 728. Subsequently, the controller 730 determines a monitoring range. At this point, the controller 730 determines the monitoring range with consideration of an operation channel of the controller and the operation channels of the other WRANs. That is, the controller 730 determines the monitoring range such that all channels via which the other WRANs may transmit CBP packets are included within a maximum extensible range including the operation channel of the controller. After determining the monitoring range, the controller 730 gives a priority for detecting a CBP packet to each channel included in the monitoring range. At this point, when the number of WRANs that use the channel is large with respect to the total number of WRANs, a high priority is given to that channel. After that, the controller 730 attempts to sequentially detect a CBP packet according to the priority. When the detection has been made for all the channels, the controller 730 determines a monitoring range again and repeats the above-described operation.

An exemplary embodiment of the present invention may prevent collision between CBP packets by allowing WRANs to transmit CBP packets via different channels using a characteristic of the scalable OFDMA in a CR wireless communication system.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for transmitting a Coexistence Beacon Protocol (CBP) packet by a transmitter that operates in a scalable Orthogonal Frequency Division Multiple Access (OFDMA) mode in a Cognitive Radio (CR) wireless communication system, the method comprising:
   giving a priority to each channel of one or more channels based at least partly upon channel use statuses of two or more neighbor Wireless Regional Area Networks (WRANs);
   sequentially determining whether a Quality of Service (QoS) for CBP packet transmission is met for each channel of one or more channels according to the respective priority;
   selecting a channel having a highest priority from the one or more channels meeting the QoS as a channel for CBP packet transmission; and
   transmitting a CBP packet via the selected channel.

2. The method of claim 1, wherein the giving of the priority to each channel comprises, when the number of WRANs that use a channel is large with respect to a total number of WRANs, giving a high priority to that channel.

3. The method of claim 1, wherein the determining of whether the QoS for the CBP packet transmission is met comprises:
   calculating a QoS satisfaction index for an object channel; and
   determining whether the QoS satisfaction index meets a satisfaction condition.

4. The method of claim 3, wherein when the CBP packet is transmitted according to a contention-based scheme, the QoS satisfaction index comprises a number of WRANs participating in the contention, and the satisfaction condition is that the number of WRANs participating in the contention is smaller than a threshold.

5. The method of claim 3, wherein when the CBP packet is transmitted according to a reservation-based scheme, the QoS satisfaction index comprises a settable minimum Self-Coexistence Window (SCW)_Active_Repetition, and the satisfaction condition is determined based on an update frequency of information contained in the CBP packet, or that the minimum SCW_Active_Repetition is smaller than a predetermined reference period.

6. The method of claim 1, further comprising, when a channel that meets the QoS does not exists, selecting a channel having a lowest priority as the channel for CBP packet transmission.

7. A method for receiving a Coexistence Beacon Protocol (CBP) packet by a receiver in a Cognitive Radio (CR) wireless communication system, the method comprising:
   determining a monitoring range for receiving a CBP packet based at least partly upon channel use statuses of two or more neighbor Wireless Regional Area Networks (WRANs);
   giving a priority to each channel of a plurality of channels included in the monitoring range;
   attempting sequentially to receive CPB packets according to the respective priority of each channel; and
   when CBP packets are received, determining information contained in the CBP packets.

8. The method of claim 7, further comprising determining a new monitoring range after attempting to receive a CBP packet via a channel having a lowest priority.

9. The method of claim 7, wherein the determining of the monitoring range comprises determining the monitoring range such that all channels via which the neighbor WRANs transmit CBP packets are included within a maximum extensible range comprising an operation channel of the receiver.

10. An apparatus of a transmitter that operates in a scalable Orthogonal Frequency Division Multiple Access (OFDMA)

mode in a Cognitive Radio (CR) wireless communication system, the apparatus comprising:
  a controller configured to give a priority to each channel of one or more channels based at least partly upon channel use statuses of two or more neighbor Wireless Regional Area Networks (WRANs), sequentially determine whether a Quality of Service (QoS) for Coexistence Beacon Protocol (CBP) packet transmission is met for each channel, and select a channel having a highest priority from the one or more channels meeting the QoS as a channel for CBP packet transmission; and
  a transmitter configured to transmit a CBP packet via the selected channel.

11. The apparatus of claim 10, wherein when the number of WRANs that use a channel is large with respect to a total number of WRANs, the controller is configured to give a high priority to the channel.

12. The apparatus of claim 10, wherein the controller is configured to calculate a QoS satisfaction index for an object channel, and determine whether the QoS satisfaction index meets a satisfaction condition.

13. The apparatus of claim 12, wherein when the CBP packet is transmitted according to a contention-based scheme, the QoS satisfaction index comprises a number of WRANs participating in the contention, and the satisfaction condition is that the number of WRANs participating in the contention is smaller than a threshold.

14. The apparatus of claim 12, wherein when the CBP packet is transmitted according to a reservation-based scheme, the QoS satisfaction index comprises a settable minimum Self-Coexistence Window (SCW)_Active_Repetition, and the satisfaction condition is determined based on an update frequency of information contained in the CBP packet, or that the minimum SCW_Active_Repetition is smaller than a predetermined reference period.

15. The apparatus of claim 10, wherein when a channel that meets the QoS does not exist, the controller is configured to select a channel having a lowest priority as the channel for CBP packet transmission.

16. An apparatus of a receiver in a Cognitive Radio (CR) wireless communication system, the apparatus comprising:
  a controller configured to determine a monitoring range for receiving a Coexistence Beacon Protocol (CBP) packet based at least partly upon channel use statuses of two or more neighbor Wireless Regional Area Networks (WRANs), give a priority to each channel of a plurality of channels included in the monitoring range, and sequentially attempt to receive CPB packets according to the respective priority of each channel; and
  a reader configured to determine information contained in CBP packets when CBP packets are received.

17. The apparatus of claim 16, wherein the controller is further configured to determine a new monitoring range after attempting to receive a CBP packet via a channel having a lowest priority.

18. The apparatus of claim 16, wherein the controller is further configured to determine the monitoring range such that all channels via which the neighbor WRANs transmit CBP packets are included within a maximum extensible range comprising an operation channel of the receiver.

19. The apparatus of claim 16, wherein the information contained in CBP packets relates to a self-coexistence algorithm.

20. The apparatus of claim 16, wherein the information contained in CBP packets includes at least one of a location of a relevant base station, sensing results, scheduling information, and a backup channel list.

* * * * *